US006640382B1

(12) United States Patent
Williams et al.

(10) Patent No.: US 6,640,382 B1
(45) Date of Patent: Nov. 4, 2003

(54) MOBILE FILTER CLEANING SYSTEM

(75) Inventors: Richard P. Williams, Louisville, KY (US); David H. Shupe, Louisville, KY (US); Thomas M. Holman, Cape Coral, FL (US); Keith E. Blair, Louisville, KY (US)

(73) Assignee: Filter-Medic, LLC, Louisville, KY (US)

( * ) Notice: Subject to any disclaimer, the term of this patent is extended or adjusted under 35 U.S.C. 154(b) by 17 days.

(21) Appl. No.: 10/037,907

(22) Filed: Nov. 9, 2001

(51) Int. Cl.[7] .................................................. A47L 5/14
(52) U.S. Cl. ............................ 15/301; 15/310; 15/345; 55/356
(58) Field of Search .................... 15/301, 310, 345, 15/340.1; 55/300, 302, 283, 356, 467, DIG. 17; 96/417

(56) References Cited

U.S. PATENT DOCUMENTS

| 963,139 | A | | 7/1910 | Griffiths |
| 3,485,671 | A | | 12/1969 | Stephens |
| 3,585,788 | A | | 6/1971 | Wilson |
| 3,604,437 | A | | 9/1971 | Tappan, Jr. |
| 3,694,847 | A | | 10/1972 | Hetman et al. |
| 3,926,596 | A | | 12/1975 | Coleman |
| 3,930,817 | A | * | 1/1976 | Stevenson et al. ............ 55/302 |
| 3,955,236 | A | | 5/1976 | Mekelburg |
| 3,958,296 | A | | 5/1976 | Fell |
| 4,808,234 | A | * | 2/1989 | McKay et al. ................. 15/345 |
| 4,820,315 | A | | 4/1989 | DeMarco |
| 5,004,156 | A | | 4/1991 | Montanier |
| 5,030,259 | A | | 7/1991 | Bryant et al. |
| 5,069,691 | A | | 12/1991 | Travis et al. |
| 5,133,100 | A | | 7/1992 | Hill et al. |
| 5,238,503 | A | * | 8/1993 | Phenix et al. ................. 55/310 |
| 5,280,662 | A | | 1/1994 | Van Fossen |
| 5,572,759 | A | | 11/1996 | Zachhuber |
| 5,584,900 | A | * | 12/1996 | Zaiser et al. .................. 55/300 |
| 5,915,439 | A | * | 6/1999 | Zaiser ........................... 15/345 |
| 5,996,171 | A | * | 12/1999 | Bowers ...................... 15/340.1 |
| 6,035,484 | A | | 3/2000 | Jones |
| 6,116,318 | A | | 9/2000 | Mauney |

* cited by examiner

Primary Examiner—Theresa T. Snider
(74) Attorney, Agent, or Firm—John F. Salazar; James E. Cole; Middleton Reutlinger

(57) ABSTRACT

The present invention provides a mobile filter cleaning system allowing movement to a site where dirty filters are located. The filter cleaning system includes a trailer or truck, an air compressor, an aftercooler, an air drier, a filter cleaning station, a compressed air tank, a dust collector, a fan and fan motor, and an airflow verification unit. Along a first fluid communication, compressed air is used to clean dirty filters in the cleaning station and filter cartridges in the dust collector. Along a second fluid communication dirt, liberated from the dirty filter is pulled from the cleaning station to the dust collector by a fan-induced draft. The compressor creates the first fluid communication and the fan creates a second fluid communication.

33 Claims, 7 Drawing Sheets

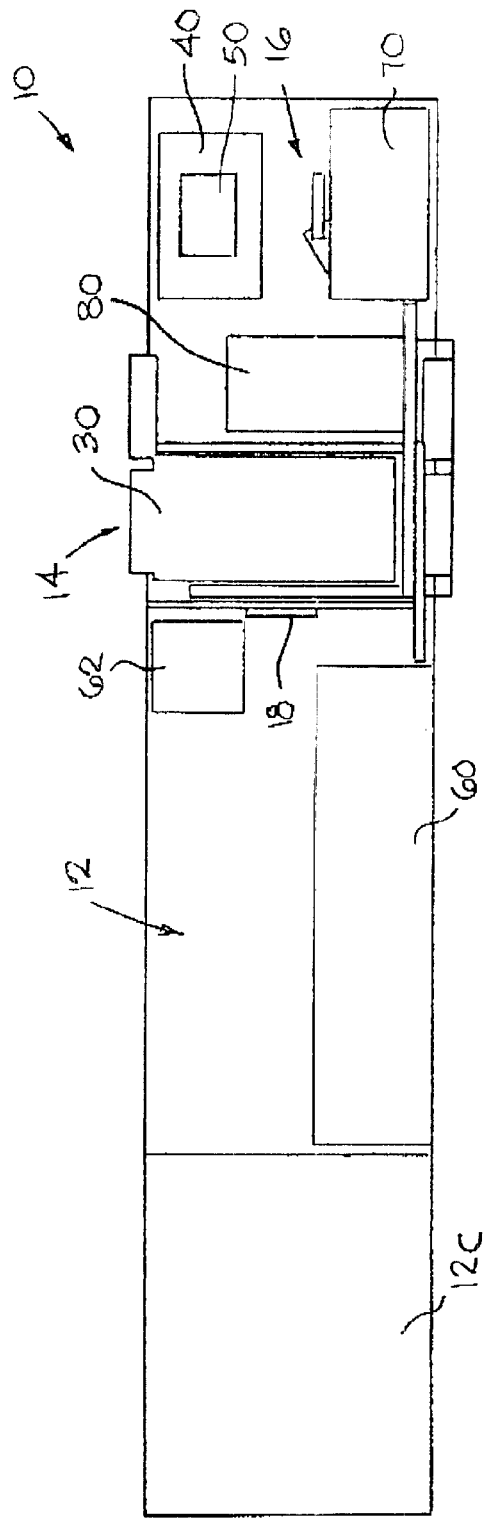
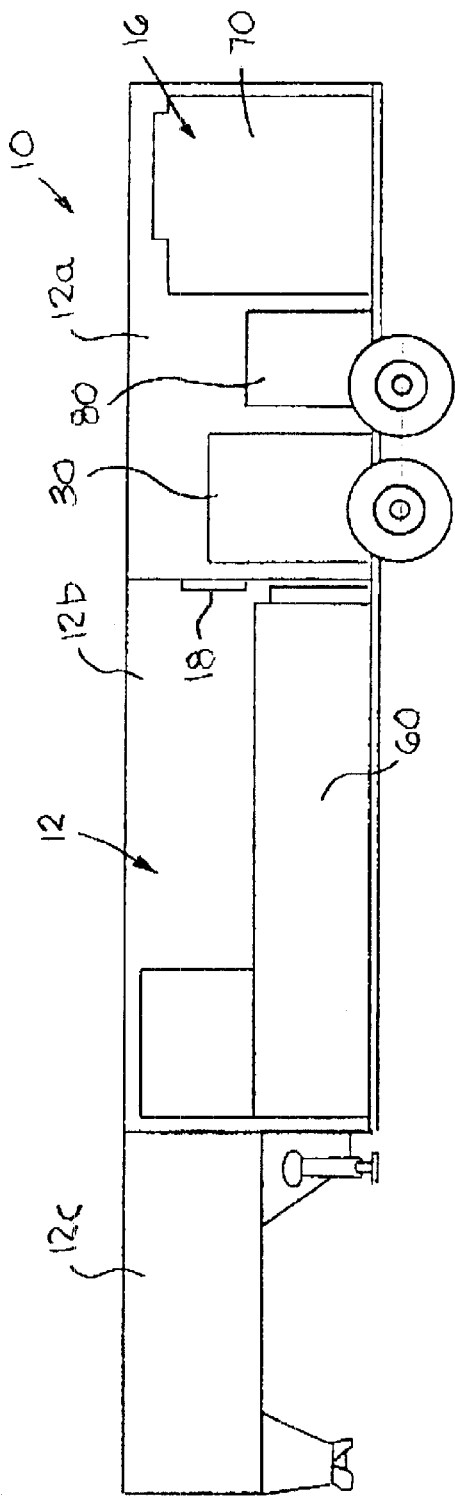
FIG. 1
FIG. 2

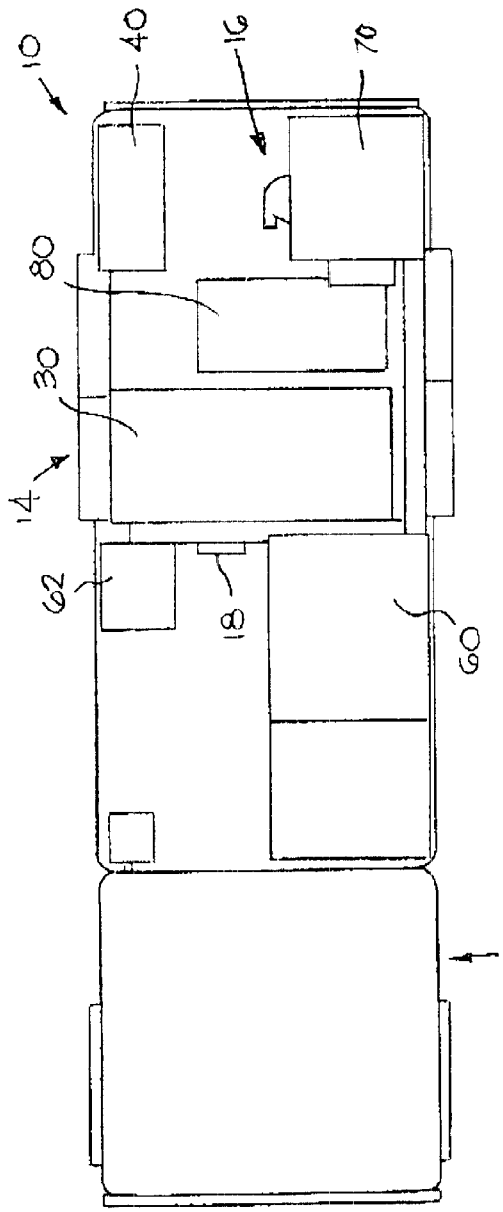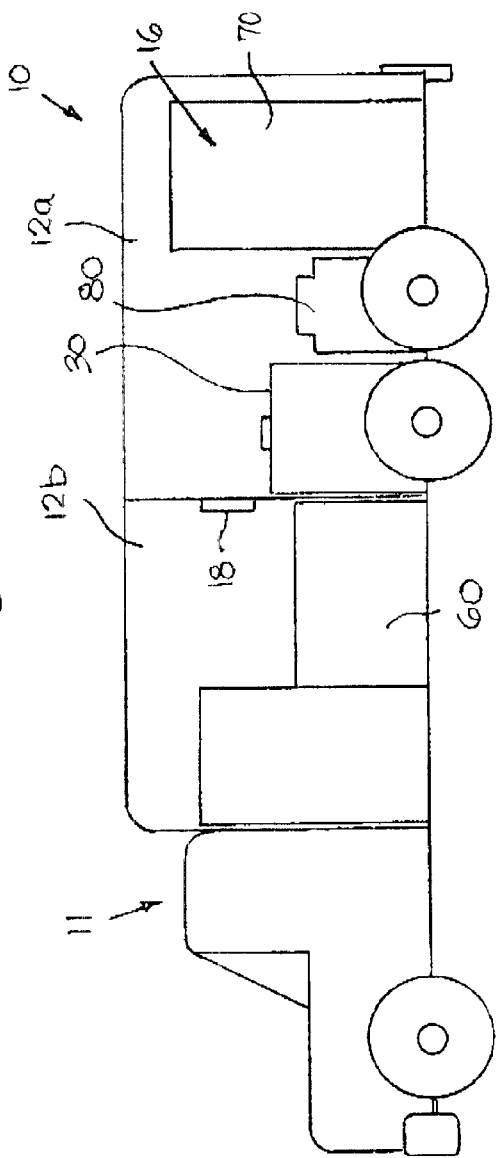

MOBILE FILTER CLEANING SYSTEM

BACKGROUND OF THE INVENTION

1. Technical Field of the Invention

The present invention relates to air filter cleaning. More particularly the present invention comprises a filter cleaning unit with a mobile conversion system to provide a mobile filter cleaning system which can be moved to various end-user sites.

2. Description of the Related Art

Manufacturing facilities needing air filters cleaned must typically send filters off-site to get them cleaned and therefore incur extra shipping expense in getting filters cleaned. In addition, although the actual cleaning process takes only a limited time, the majority of the time spent having filters cleaned involves shipping the filters off-site for cleaning.

In view of the deficiencies in the known air filter cleaning devices it is apparent that a air filter cleaning device is needed which is mobile and self-contained so that it can be taken to facilities requiring air filter cleaning.

SUMMARY OF THE INVENTION

A mobile filter cleaning system comprising a truck or trailer having a power station, a cleaning station, and a dust collection system contained therein is disclosed. The power station, cleaning station, and dust collection system are in first and second fluid communications and the power station in electrical communication with the cleaning station and the dust collection system. The system of the present invention is further a mobile filter cleaning system, comprising a trailer, an air compressor, a generator, a dust collector, a fan, an aftercooler, and an air drier positioned in a first compartment, a cleaning station positioned in a second compartment, the air compressor, dust collector, aftercooler, and air drier in a first fluid communication, the fan, dust collector, and cleaning station being in a second fluid communication.

More specifically, the power station comprises an air compressor preferably powered by a diesel engine and the power station comprises a generator preferably powered by a diesel engine. The air compressor creates a first positively pressurized fluid flow for a first fluid communication and a fan creates a second negatively pressurized fluid flow for a second fluid communication.

The dust collection system comprises an aftercooler and an air drier in first fluid communication with the air compressor and the dust collector. The dust collection system further comprises a first and a second coalescent filter positioned between the aftercooler and the air drier and being in a first fluid communication with said air compressor. The air drier is preferably a refrigeration air drier. The dust collection system further comprises a dust collector in a second and first fluid communications respectively with a fan and with said air compressor. The dust collector is also in first fluid communication with the aftercooler and the air drier.

The air compressor creates a first fluid communication with the cleaning station and dust collection system. A fan creates a second fluid communication with the cleaning station through a first adjustable gate. The fan creates a negative pressure in the dust collection system and the cleaning station while the compressor creates a positive pressure in the cleaning station and dust collector. The mobile filter cleaning system further comprises an air flow verification unit in second fluid communication with the fan and a second adjustable gate. The fan produces a flow rate of about 1500 CFM and is in second fluid communication with the dust collector.

The diesel generator is in electrical communication with the fan, the cleaning station, the air drier, the dust collector, the aftercooler and the control panel.

It is an object of the present invention to provide an air filter cleaning system.

It is a further objective of this invention to provide a mobile air filter cleaning system.

It is an even further objective of this invention to provide a mobile air filter cleaning system capable of cleaning a plurality of filter sizes.

It is yet an even further objective to provide a compressed air source to dislodge dirt and debris from the air filters and a fan induced vacuum to collect the dirt and debris liberated from the filters.

It is yet an even further objective to collect dirt and debris cleaned from the air filters so that it is not released into the atmosphere.

All of the above outlined objectives are to be understood as exemplary only and many more objectives of the invention may be gleaned from the disclosure herein. Therefore, no limiting interpretation of the objectives noted are to be understood without further reading of the entire specification and drawings included herewith.

BRIEF DESCRIPTION OF THE DRAWINGS

The aspects and advantages of the present invention will be better understood when the detailed description of the preferred embodiment is taken in conjunction with the accompanying drawings, in which:

FIG. 1 shows a top view of the mobile filter cleaning system of the present intention;

FIG. 2 shows a side view of the mobile filter cleaning system of FIG. 1;

FIG. 9 shows a top view of a truck of the present invention; and,

FIG. 10 shows a side view of a truck of the present invention.

DETAILED DESCRIPTION OF THE PREFERRED EMBODIMENT

Figure 3:
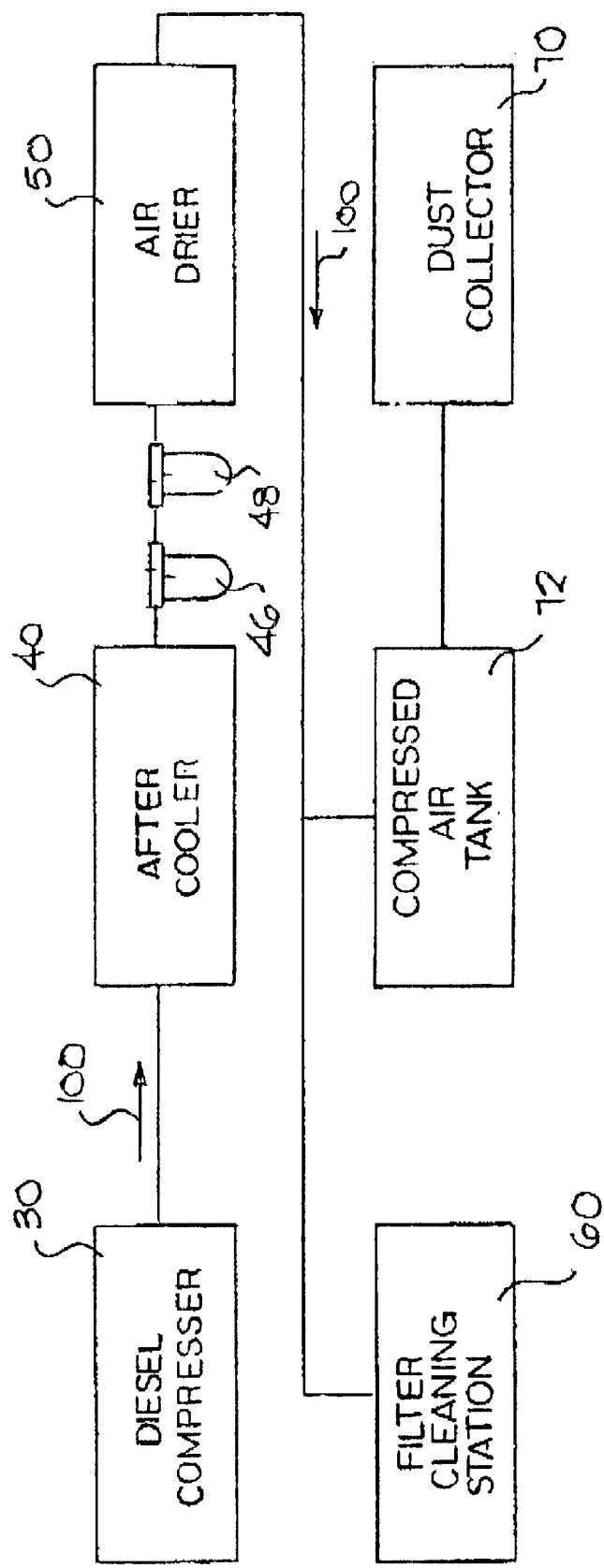
FIG. 3 shows a flow path of the compressed air through the filter cleaning system of FIG. 1.

FIGS. 1 and 2 show the mobile filter cleaning system 10 of the present invention. The mobile filter cleaning system 10 is housed within a trailer 12 which allows the mobile filter cleaner 10 to be moved from one work site to another easily, quickly, and with relatively little expense. The trailer 12 has a first compartment 12a housing a power station 14 and dust collection system 16, a second compartment 12b housing a cleaning station 60 and air flow verification unit 62, and a storage compartment 12c.

Figure 5:
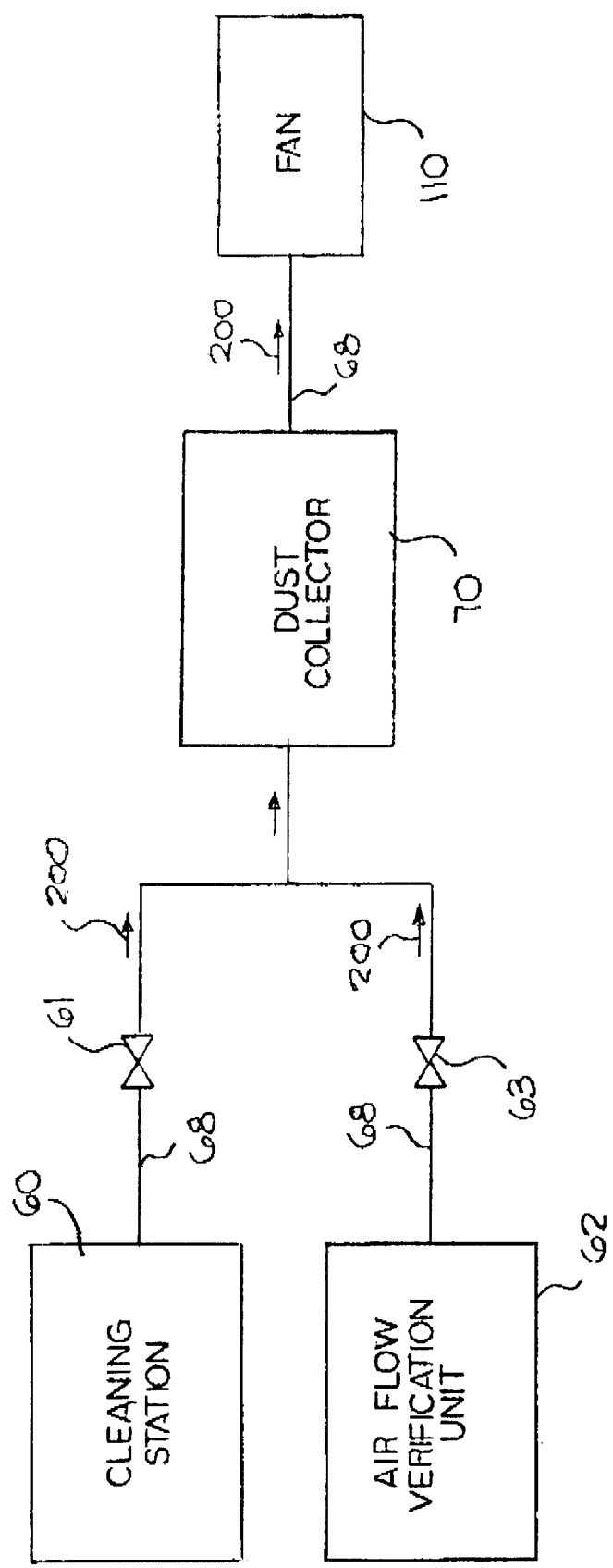
FIG. 5 shows the air duct system between the dust collector fan and cleaning station.

The filter cleaning station 60 is utilized and may be similar to that described in U.S. Pat. Nos. 5,584,900 and 5,915,439 to Zaiser et. al and Zaiser respectively incorporated by reference herein. The filter cleaning station 60 is used to clean air filters by using compressed air nozzles and compressed air hammers as described therein. Referring to FIG. 5, the cleaning station 60 is connected to a fan 110 by duct 68 and a first adjustable duct gate or valve 61. Also connected to the fan 110 by duct 68 and a second adjustable duct gate 63 is the airflow verification unit 62. The airflow verification unit 62 is used to test the pressure differential across an air filter, before and after cleaning. The airflow verification unit 62 may be used to ensure proper cleaning of the filter and preferably can measure airflow up to 1000 CFM and 10 inches of water resistance.

Figure 4:
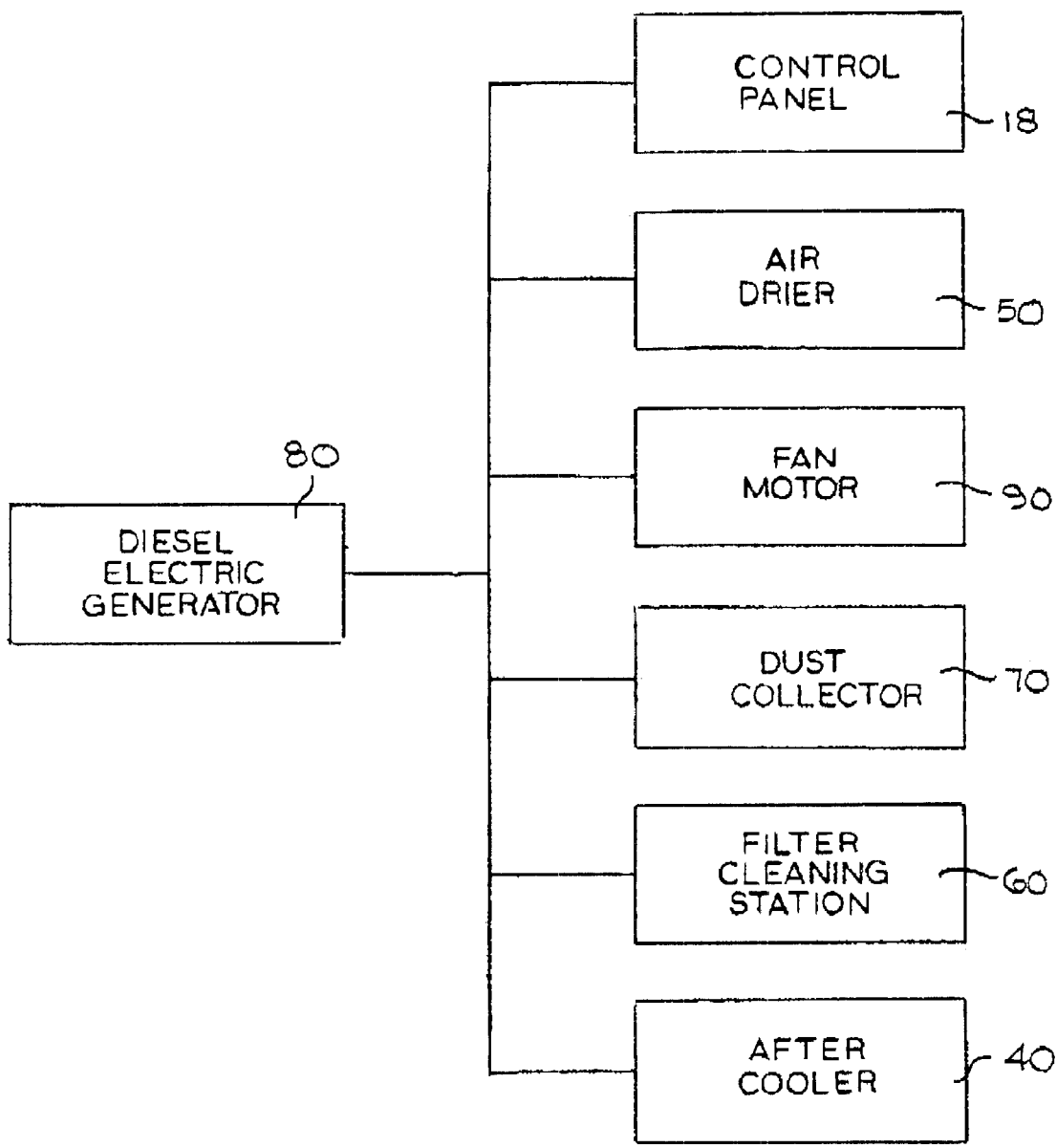
FIG. 4 shows a schematic of the electrical connectivity of the filter cleaning system of the present invention.

As shown in FIGS. 1,3 and 4 the power station 14 is comprised of an air compressor 30 and a generator 80. The compressor 30, is preferably diesel powered and supplies compressed air to various components discussed below while the generator 80 supplies electricity to power various components of the mobile filter cleaning system 10. The dust collection station 16 includes a dust collector 70, a compressed air tank 72, an after cooler 40, an air drier 50, fan 110, and a fan motor 90.

Power station 14 comprises air compressor 30 which provides, for example, 185 cubic feet per minute of air at a pressure of about one hundred twenty-five psi (125 psi). The compressor 30 of the present embodiment may be powered by a diesel engine or, alternatively, an electric motor as known in the art. The compressor 30 is preferably an oil-flooded screw type compressor and may be mounted on springs within trailer 12 to provide shock absorption and prevent damage to the compressor 30 during travel and operation. The compressor 30 is in electrical communication with a remote operating panel 18 for starting, stopping, and monitoring operating characteristics such as fuel gauge.

Figure 8:
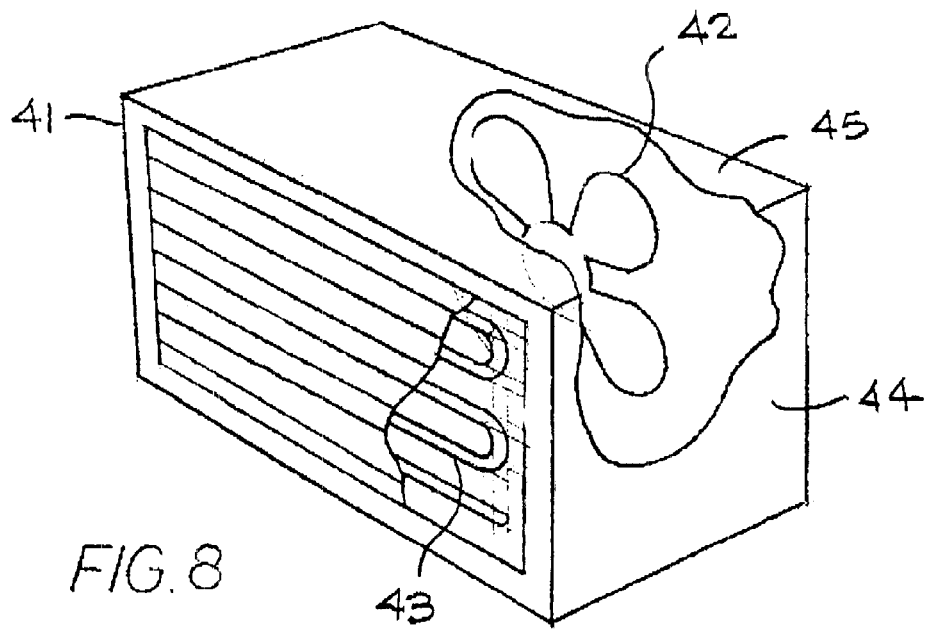
FIG. 8 shows an aftercooler of the present invention for cooling compressed air.

As depicted in FIG. 3, a first fluid communication 100 with the air compressor 30 is aftercooler 40, which cools the temperature of the compressed air to within a usable range. The first fluid flow 100 exiting the compressor 30 has positive pressure and may be between about one-hundred eighty (180°) to two-hundred (200°) degrees Fahrenheit. Aftercooler 40, as shown in FIGS. 3 and 8, comprises an air inlet 41 which coils throughout an enclosure 45. A fan 42 adjacent to the enclosure 45 blows air over the coil 43 through which the compressed air passes. As compressed air leaves air compressor 30 the temperature is necessarily high due to the heat generated by compressing air molecules from a larger to a smaller volume. As a result, the compressed air must be cooled so as not to damage components which rely on the compressed air. As the compressed air is cooled, preferably by about 40 degrees F. (40°) in the aftercooler 40, water vapor condenses out of the compressed air. Removal of the condensation is essential to properly maintain downstream components which rely on the compressed air. For instance, water vapor can cause internal parts to rust if water is repeatedly introduced to their operating environment. This is even more important with air filters because the water vapor can cause dirt and substances collected on filters to stick and cake. Thus, the compressed air must be dry when introduced to the dust collector 70 and the cleaning station 60.

As a second step to drying, the condensation may be removed by installing two coalescent filters 46,48 downstream of the aftercooler 40, shown in FIG. 3. A first coalescent filter 46 removes water and oil while having a drain valve (not shown) for removing the captured water and oil from the system. The first coalescent filter 46 preferably has a gauge measuring pressure drop across the filter 46. When the pressure drop reaches a predetermined value, the drain valve open and compressed air expels the oil and water out of the system. In addition, the present embodiment preferably has a second coalescent filter 48 for capturing any particulate matter entrained in the compressed air.

As a third step in removing water from the compressed air, air drier 50 is also in the first fluid communication 100. The air drier 50 preferably comprises a refrigeration drier but, alternatively, may be a desiccant drier. The air drier 50 is in downstream fluid communication 100 with aftercooler 40 and first and second coalescent filters 46,48. The air drier 50 receives clean dry compressed air front the first and second coalescent filters 46,48 and further cools the compressed air to condense any remaining water vapor from the compressed air. As the compressed air enters the air drier 50, coils with refrigerant such as environmentally safe R-134a flowing therethrough, are positioned adjacent to the compressed air piping. The compressed air piping exchanges heat with the refrigerant coil, cooling the compressed air and condensing any water vapor remaining in the compressed air.

Figure 6:
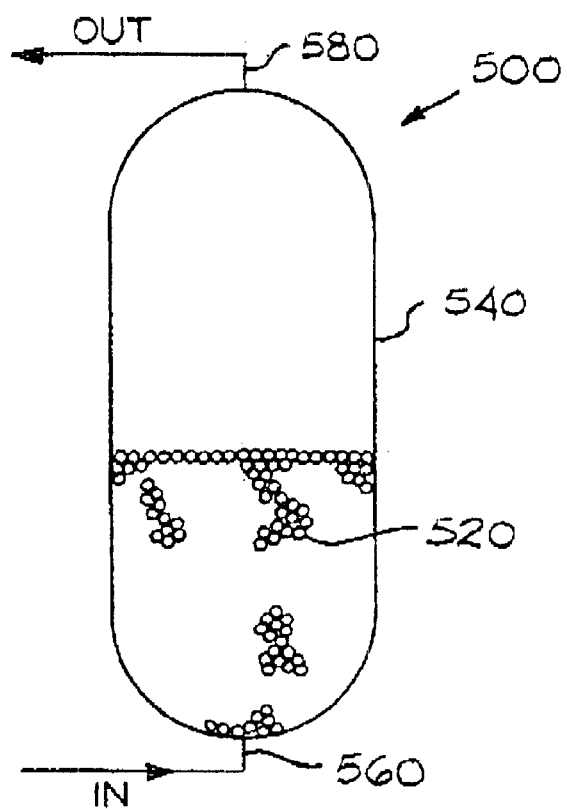
FIG. 6 shows an alternative air drier having a desiccant tank for drying compressed air.

Alternatively, a desiccant air drier 500 may be used As shown in FIG. 6 the at least one desiccant tank 540 contains a mass of desiccant 520 therein. Compressed air is introduced at an air inlet 560 and moves over the desiccant 520 which further dries the compressed air before exiting through outlet 580. In applications where more than one tank 540 is used, at least one tank 540 may be in an offline drying mode to dry the desiccant 520 and increase its water collection efficiency while online tank(s) 540 dry the compressed air. The air drier 50, or alternatively 500, is also in fluid communication with the filter cleaning station 60 for filter clearing and compressed air tank 72 for supplying compressed air to the baghouse dust collector 70.

The power station 14 also comprises a generator 80, preferably being diesel powered and shown in FIG. 4. The generator 80 provides electricity for the air drier 50, the aftercooler 40, the fan motor 90, the dust collector 70, the filter cleaning station 60, and e control panel 18. The generator 80 is preferably powered by a diesel engine from which the generator 80 produces about 25 kilowatts of power. The remote operating panel 18 is located in the second trailer compartment 12b for controlling the compressor 30 and generator 80 in a safer, quieter environment.

Figure 7:
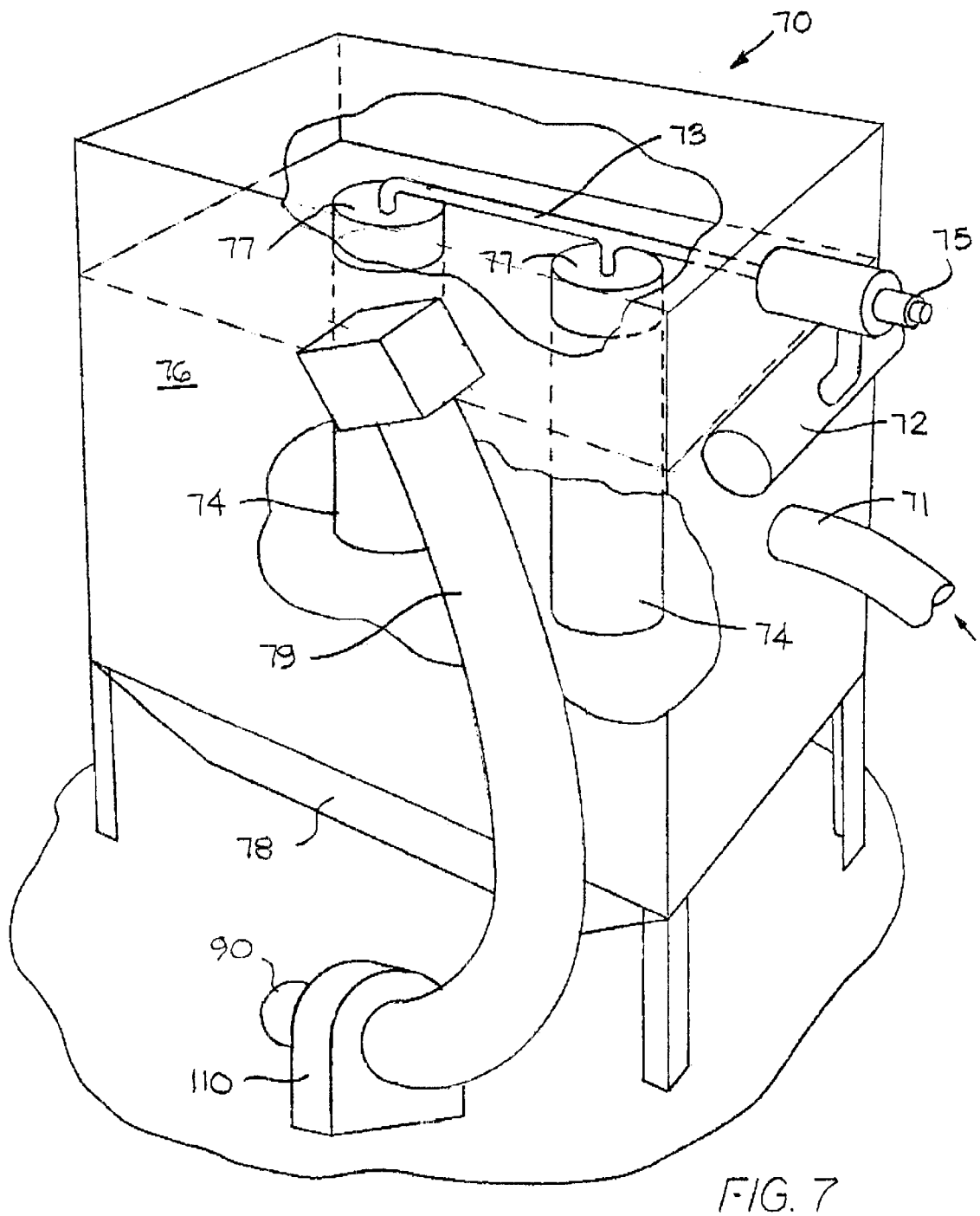
FIG. 7 shows the dust collector of the mobile filter cleaning system of the present invention.

A second negatively pressurized fluid communication 200 is used to collect dust and debris as well as test the cleaned filters. The second fluid communication 200, shown in FIG. 5 is created by a fan 110 operably connected to a preferably seven and one-half horsepower (7½HP) motor for turning fan 110 and providing a vacuum on the cleaning station 60, the airflow verification unit 62, and across the dust collector 70. The dust collection station 16 includes dust collector 70, compressed air tank 72, after cooler 40, air drier 50, fan 110, and fan motor 90. The fan 110 preferably produces about 1500 CFM at eight inches (8") water gauge negative pressure and is clearly shown in FIG. 7. The dust collector 70 preferably has a single chamber 76 with two filter cartridges 74 depending from holes 77 in a ceiling of the chamber 76. The holes 77 provide the only method of air escape from the chamber 76 and therefore air must pass through the cartridges 74 before reaching fan 110.

Above the chamber 76 and cartridges 74 is a compressed air pipe 73 which is positioned to exhaust compressed air down through cartridges 74 when valve 75 opens. Valve 75 is in electrical communication with a programmable timer board (not shown) which cycles compressed air valve 75 open and closed for cartridge 74 cleaning. In fluid communication with the air drier 50 and dust collector 70 is compressed air tank 72 capable of storing quantities of compressed air. The purpose of having the tank 72 in fluid communication with dust collector 70 is that the tank 72 provides a smooth, constant supply of compressed air to the dust collector 70 and valve 75 so as not to subject those parts to spikes in air pressure or sudden drops in pressure, such as if the compressor suddenly stops running. Below chamber 76 is a hopper 78 for collecting debris which is blown from the filter cartridges 74. From the hopper 78, the debris and dirt car easily be collected.

In use, the filter cleaning system 10 is moved to a location where filters need cleaning. The diesel powered air compressor 30 and the diesel powered generator 80 are started so the filter cleaning system 10 has compressed air and electricity. Next fan 110 is started by powering fan motor 90. Finally, the air drier 50, after cooler 40, dust collector 70, and filter cleaning station 60 are all powered so that the process of cleaning filters can begin.

Initially, gate 61 of FIG. 5 is closed thereby stopping second fluid communication 200 on the cleaning station 60. Gate 63 is opened directing the second fluid communication to the airflow verification unit 62 which is calibrated using a restriction orifice located in duct 68. Once an initial setpoint is obtained for the verification unit 62, a dirt filter is placed in the verification unit 62 to determine a pressure drop across the filter and to calculate an airflow rate through the filter. After this is completed the filter is placed in the cleaning station 60 and gate 63 is closed while gate 61 is opened. Opening gate 61 places a vacuum on the cleaning station 60 for collection of filter dirt and debris. After a cleaning cycle in the cleaning station 60, gate 61 is closes and gate 63 opened until the initial setpoint is again obtained. The filter is again placed in the airflow verification unit 62. The pressure differential across the filter is measured in the airflow verification system 62 by closing gate 61 and opening gate 63. If the pressure drop across the cleaned filter is within a desired range then a next filter is cleaned. If the pressure differential is not within the desired range, then the filter is cleaned again, or removed from service and replaced. During the cleaning cycle, the compressed air supplied to the air nozzle and the air hammer, utilized in the cleaning station 60, dislodges foreign materials from the filter. The pressure differential across the filter should decrease as the filter is cleaned. As the cleaning station 60 dislodges the matter from the filter during cleaning, the vacuum induced by fan 110 pulls the dirt into dust collector 70. Dirty air is pulled into chamber 76 of FIG. 7 through air inlet 71 and passes through filter cartridges 74. Dirt collects on the outer surface of the cartridges 74, while the clean air is able to pass through the cartridges 74, through dust collector ceiling holes 77, and on to the dust collector outlet 79. During the cleaning process, a programmable timer board (not shown) cycles valve 75 between an open and a normally closed position. When the valve 75 opens compressed air passes through piping 73 and is directed downward through cartridges 74. The force of the compressed air causes the filter cartridges 74 to flex outward dislodging dirt from the cartridges 74 and causing the dirt to fall into a hopper 78 at the bottom of chamber 76.

When the cleaning cycle is finished, the pressure differential across the filter is checked. As discussed above, gate 63 is opened and gate 61 is closed to obtain the initial setpoint. Next, the cleaned filter is placed in the air flow verification unit 62 and the pressure differential across the filter is measured. If the pressure differential is within an acceptable range, a next filter is cleaned.

As shown in FIGS. 9 and 10 the present invention, as discussed above, can be loaded onto an enclosed flat bed truck 11 instead of a trailer 12. The system is operable in either configuration.

To summarize, the present invention provides a mobile filter cleaning system allowing movement to an industrial site where dirty filters are located. The filter cleaning system comprises a trailer, an air compressor, an aftercooler, an air drier, a filter cleaning station, a compressed air tank, a baghouse dust collector, a fan and fan motor, and an airflow verification unit. Dirt and debris liberated from the filter is pulled from the cleaning station to the dust collector by a fan-induced draft. The compressor is used to clean the filter and filter cartridges in the dust collector. This system provides an easy way for filters to be cleaned at a manufacturing facility instead of being shipped away.

The foregoing detailed description is primarily given for clearness of understanding for the edge seal dispensing closure of the present invention and no unnecessary limitations are to be understood therefrom of from the particular examples, functions and embodiments given herein. Modifications and other variations will become obvious to those skilled in the art upon reading of the disclosure contained herein including the figures and submitted claims without parting from the spirit of the invention of this scope of the appended claims.

What is claimed is:

1. A mobile filter cleaning system, comprising:
a trailer having a power station, a cleaning station, and a dust collection system contained therein;
said power station, cleaning station, and dust collection system in fluid communication with one another; and,
said power station electrically connected to said cleaning station and said dust collection system.

2. The mobile filter cleaning system of claim 1, wherein said power station comprises an air compressor.

3. The mobile filter cleaning system of claim 2, wherein said air compressor is powered by a diesel engine.

4. The mobile filter cleaning system of claim 1, wherein said power station comprises a generator.

5. The mobile filter cleaning system of claim 4, wherein said generator is powered by a diesel engine.

6. The mobile filter cleaning system of claim 1, wherein said dust collection system comprises an aftercooler and an air drier in a first fluid communication with said air compressor and said dust collector.

7. The mobile filter cleaning system of claim 6, wherein said dust collection system further comprises a first and a second coalescent filter positioned between said aftercooler and said air drier and being in said first fluid communication with said air compressor.

8. The mobile filter cleaning system of claim 7, wherein said air drier is a refrigeration air drier.

9. The mobile filter cleaning system of claim 1, wherein said dust collection system further comprises a dust collector in a second and a first fluid communication with a fan and with an air compressor respectively.

10. The mobile filter cleaning system of claim 9, wherein said dust collector is in said first fluid communication with an aftercooler and an air drier.

11. The mobile filter cleaning system of claim 10, wherein said air compressor is in said first fluid communication with said cleaning station.

12. The mobile filter cleaning system of claim 10 wherein said fan creates a negative pressure in said dust collection system and said cleaning station.

13. The mobile filter cleaning system of claim 1 wherein said cleaning station is in a second fluid communication with a fan and a first adjustable gate.

14. The mobile filter cleaning system of claim 13, further comprising an air flow verification unit, said airflow verification unit in said second fluid communication with said fan and a second adjustable gate.

15. The mobile filter cleaning system of claim 14 wherein said fan produces a flow rate of about 1500 CFM.

16. The mobile filter cleaning system of claim 15 wherein said fan is in said second fluid communication with said dust collection system.

17. The mobile filter cleaning system of claim 16 wherein a diesel generator is in electrical communication with said fan, said cleaning station, an air drier, and said dust collector.

18. A mobile filter cleaning system, comprising:
   a trailer;
   an air compressor, a generator, a dust collector, a fan, an aftercooler, and an air drier positioned in a first compartment;
   a cleaning station positioned in a second compartment; and,
   said air compressor, said dust collector, said aftercooler, and said air drier in a first fluid communication with one another;
   said fan, said dust collector, and said cleaning station being in a second fluid communication with one another.

19. The mobile filter cleaning system of claim 18, wherein said first fluid communication is positively pressurized and said second fluid communication is negatively pressurized.

20. The mobile filter cleaning system of claim 19, further comprising a first and a second coalescent filter positioned between said aftercooler and said air drier and being in said first fluid communication with said air compressor, said dust collector, said aftercooler, and said air drier.

21. The mobile filter cleaning system of claim 18, further comprising a remote operating panel mounted in said second compartment and electrically connected to said air compressor and said generator.

22. The mobile filter cleaning system of claim 21, further comprising a compressed air tank in said first fluid communication with said dust collector.

23. The mobile filter cleaning system of claim 18 wherein said compressor operates at about 125 psi.

24. The mobile filter cleaning system of claim 18, wherein said dust collector includes a hopper, a first chamber above said hopper, said chamber having at least one hole in an upper side, a filter cartridge depending from said hole, and a compressed air pipe positioned above said cartridge.

25. The mobile filter cleaning system of claim 18, further comprising an airflow verification unit in said second fluid communication with said fan.

26. The mobile filter cleaning system of claim 25, further comprising a gate in said second fluid communication with said airflow verification unit and said fan.

27. A mobile filter cleaning system, comprising:
   a trailer having a first and a second compartment;
   a power station enclosed in said first compartment of said trailer;
   a dust collection station enclosed in said first compartment of said trailer;
   a cleaning station enclosed in said second compartment of said trailer;
   said power station including an air compressor and a generator;
   said air compressor being in a first fluid communication with an aftercooler in said first compartment, an air drier in said first compartment, said cleaning station, a compressed air tank, and said dust collection station;
   said dust collection station comprising a fan, a dust collector, and an airflow verification unit in a second fluid communication.

28. A mobile filter cleaning system, comprising:
   a trailer;
   a power station in said trailer, said power station including an air compressor and a generator;
   a dust collection system enclosed in said trailer;
   a cleaning station enclosed in said trailer;
   said air compressor being in a first fluid communication with an aftercooler in a first compartment, an air drier in said first compartment, said cleaning station, a compressed air tank, and a dust collector;
   said dust collection system comprising a fan, said dust collector, and an airflow verification unit in a second fluid communication;
   said trailer further comprising a remote operating panel in a second compartment.

29. The mobile filter cleaning system of claim 28, further comprising a first adjustable gate in said second fluid communication with said cleaning station and said fan.

30. The mobile filter cleaning system of claim 29, further comprising a second adjustable gate in said second fluid communication with said fan and said airflow verification unit.

31. The mobile filter cleaning system of claim 28, further comprising a positive pressure airflow in said first fluid communication and a negative pressure air flow in said second fluid communication.

32. A mobile filter cleaning system, comprising:
   a truck having a power station, a cleaning station, and a dust collection system contained therein;
   said power station, cleaning station, and dust collection system in fluid communication with one another; and,
   said power station electrically connected to said cleaning station and said dust collection system.

33. A mobile filter cleaning system, comprising:
   a truck;
   a power station in said truck, said power station including an air compressor and a generator;
   a dust collection system enclosed in said truck;
   a cleaning station enclosed in said truck;
   said air compressor being in a first fluid communication with an aftercooler in said truck, an air drier in said truck, said cleaning station, a compressed air tank, and a dust collector;
   said dust collection system comprising a fan, a dust collector, and an airflow verification unit in a second fluid communication;
   said truck further comprising a remote operating panel positioned on an interior wall of said truck.

\* \* \* \* \*